(12) United States Patent
Ebina et al.

(10) Patent No.: US 11,034,140 B2
(45) Date of Patent: Jun. 15, 2021

(54) COATING AGENT CONTAINING CLAY, RESIN, AND ORGANIC SOLVENT, PROTECTIVE FILM USING SAME, AND PRODUCT

(71) Applicants: National Institute of Advanced Industrial Science and Technology, Tokyo (JP); Kunimine Industries Co., Ltd., Tokyo (JP)

(72) Inventors: Takeo Ebina, Miyagi (JP); Ryo Ishii, Miyagi (JP); Hiromichi Hayashi, Miyagi (JP); Yoshito Wakui, Miyagi (JP); Emiko Tomon, Miyagi (JP); Yasuhiro Saura, Miyagi (JP); Midori Saura, Miyagi (JP); Yasukatu Matukawa, Miyagi (JP); Shinsuke Kimura, Miyagi (JP)

(73) Assignees: National Institute of Advanced Industrial Science and Technology, Tokyo (JP); Kunimine Industries Co., Ltd., Tokyo (JP)

( * ) Notice: Subject to any disclaimer, the term of this patent is extended or adjusted under 35 U.S.C. 154(b) by 165 days.

(21) Appl. No.: 15/775,896

(22) PCT Filed: Nov. 17, 2016

(86) PCT No.: PCT/JP2016/084096
§ 371 (c)(1),
(2) Date: May 14, 2018

(87) PCT Pub. No.: WO2017/086383
PCT Pub. Date: May 26, 2017

(65) Prior Publication Data
US 2018/0326707 A1 Nov. 15, 2018

(30) Foreign Application Priority Data
Nov. 20, 2015 (JP) .............................. JP2015-227476

(51) Int. Cl.
| | | |
|---|---|---|
| B32B 27/20 | (2006.01) | |
| B32B 7/02 | (2019.01) | |
| B32B 18/00 | (2006.01) | |
| B32B 27/40 | (2006.01) | |
| C09D 171/02 | (2006.01) | |
| C09D 7/40 | (2018.01) | |
| C09D 7/20 | (2018.01) | |
| C09D 4/00 | (2006.01) | |

(52) U.S. Cl.
CPC ............... *B32B 27/20* (2013.01); *B32B 7/02* (2013.01); *B32B 18/00* (2013.01); *B32B 27/40* (2013.01); *C09D 4/00* (2013.01); *C09D 7/20* (2018.01); *C09D 7/40* (2018.01); *Y10T 428/25* (2015.01)

(58) Field of Classification Search
CPC combination set(s) only.
See application file for complete search history.

(56) References Cited

U.S. PATENT DOCUMENTS

| | | | |
|---|---|---|---|
| 3,422,185 A | 1/1969 | Kuritzkes | |
| 6,832,037 B2 * | 12/2004 | Aylward | ................ G02B 6/138 385/145 |
| 2007/0178238 A1 | 8/2007 | Yamada et al. | |
| 2011/0118393 A1 | 5/2011 | Yen et al. | |
| 2011/0143066 A1 * | 6/2011 | Roddy | ..................... C08K 3/04 428/35.4 |
| 2013/0258481 A1 | 10/2013 | Fukuda et al. | |

FOREIGN PATENT DOCUMENTS

| | | | |
|---|---|---|---|
| JP | H11460 A | 1/1999 | |
| JP | 2002030238 A | 1/2002 | |
| JP | 2003267839 A | 9/2003 | |
| JP | 2004294982 A | 10/2004 | |
| JP | 2005070096 A | 3/2005 | |
| JP | 2005179865 A | 7/2005 | |
| JP | 2005338215 A | 12/2005 | |
| JP | 2007063118 A | 3/2007 | |
| JP | 2007268420 A | 10/2007 | |
| JP | 2008050235 A | 3/2008 | |
| JP | 2008088321 A | * | 4/2008 |
| JP | 2008161856 A | 7/2008 | |
| JP | 2010222453 A | 10/2010 | |
| JP | 2010248451 A | 11/2010 | |
| JP | 2011065146 A | 3/2011 | |
| JP | 2013071933 A | 4/2013 | |
| JP | 2013105160 A | 5/2013 | |

(Continued)

OTHER PUBLICATIONS

Mihara et al., JP-2008088321-A, Apr. 17, 2008 (Machine translation) (Year: 2008).*
Extended European Search Report and Written Opinion received in EPEP20160866384 dated Jun. 19, 2019.
Chang, et al., "UV curable transparent urethane-acrylate/clay nanocomposite coating materials with thermal barrier property", Oct. 15, 2013, pp. 182-187, vol. 232, Publisher: Surface and Coatings Technology.
Takeo, et al., "Organized Clay Polymer Composite Coating as a traditional lacquer protection layer Consideration", "Abstracts of Presentations on the 58th Clay Science Symposium", Sep. 24, 2014, p. 40-41, Publisher: 58th Clay Science Symposium Executive Committee (Machine translation).

(Continued)

*Primary Examiner* — Cheng Yuan Huang
(74) *Attorney, Agent, or Firm* — Suzannah K. Sundby, Esq.; Canady + Lortz LLP

(57) ABSTRACT

Disclosed herein is a coating agent containing a synthetic organically-modified clay comprising a synthetic clay and an organic modification agent, a resin, and an organic solvent, wherein the organic solvent is contained in an amount within the range of 5-70 parts by weight with respect to 30 parts by weight of the resin, and contains at least two selected from the group consisting of toluene, xylene, and ethylbenzene; a protective film using the same; and a product provided with the protective film.

17 Claims, 6 Drawing Sheets

(56) References Cited

FOREIGN PATENT DOCUMENTS

JP         2013228720 A     11/2013
JP         2014209138 A     11/2014

OTHER PUBLICATIONS

Inceoglu, et al., "Effect of Organoclay on the Physical Properties of UV-Curable Coatings", Jun. 12, 2009, pp. 255-273, vol. 1008, Ch. 13, Publisher: Nanotechnology Applications in Coatings, ACS Symposium Series.

Nkeuwa, et al., "UV-cured clay/based nanocomposite topcoats for wood furniture: Part I: Morphological study, water vapor transmission rate and optical clarity", Jan. 2014, pp. 111, vol. 77, No. 1, Publisher: Progress in Organic Coatings.

* cited by examiner

COATING AGENT CONTAINING CLAY, RESIN, AND ORGANIC SOLVENT, PROTECTIVE FILM USING SAME, AND PRODUCT

TECHNICAL FIELD

The present invention relates to a coating agent containing a clay, a resin, and an organic solvent, a protective film using the same, and a product. More particularly, the present invention relates to a coating agent which, when coated on the surface of a three-dimensional shape and dried, forms a protective film excellent in ultraviolet resistance, scratch resistance, and light transmittance, thereby increasing ultraviolet resistance and scratch resistance of a product, and also relates to a protective film using the coating agent, and a product to which the protective film is applied.

BACKGROUND ART

Following changes in lifestyle in recent years, products that are used every day, such as tableware, are required to be durable and to have better maintainability and handleability, for example, easily washable in a dishwasher. For this reason, the product surface has been provided with a hard coat or the like.

A method of high-temperature baking a glass-based inorganic coating on the product surface is generally used to provide a hard coat on the surface of a product such as tableware. However, when the product is lacquerware, the lacquering process itself is generally a process of coating and drying at around room temperature, and a dye and a resin contained in the lacquered surface coating layer decompose at high temperature. The resulting problem is that when a hard coat layer is provided thereon, a hard coat layer which requires a heat treatment process cannot be provided. Another problem is that dyes in the lacquerware fade under ultraviolet radiation or the like.

For this reason, it is necessary to develop a protective film which is capable of tightly adhering to the lacquerware surface with sufficient strength as a result of low-temperature treatment and has hard coat properties, durability against washing in a dishwasher or the like, transparency, ultraviolet resistance, and ultraviolet blocking property.

For example, the following prior art coating techniques aimed at increasing the durability of products are known.

PTL (Patent Literature) 1 discloses the use of an organic-inorganic hybrid material as a waterproof cured coating film. However, this hybrid material additionally includes inorganic oxide particles, and very high transparency is difficult to achieve. PTL 2 reports a technique for preventing fading due to ultraviolet radiation and maintaining glossiness by adding inorganic fine particles (zinc oxide, silica, titanium oxide) to lacquer. However, a problem associated with coatings containing inorganic fine particles that absorb ultraviolet radiation is that such coatings tend to become opaque and a low haze cannot be achieved.

PTL 3 discloses an ink containing an organic clay treated with a quaternary ammonium salt and an ultraviolet-curable resin. However, the object of the invention disclosed in this patent literature is to provide an ultraviolet-curable ink for stencil printing which is characterized in being suitable for stencil printing, having a high yield value, and being excellent in on-machine stability, and such an ink cannot form a protective film with scratch resistance and ultraviolet resistance.

PTL 4 is aimed at providing a method capable of forming easily and at low cost a coating layer with excellent antifouling property at high temperature, and discloses a method for forming a coating layer by preparing several types of coating liquids containing a polysilazane and an acrylic resin by varying the mixing ratio thereof, and laying a plurality of these solutions one on the other. This method does not use an organically-modified clay, requires to lay multiple layers, and does not have ultraviolet resistance as a function.

The inventors of the present invention have been developing a highly durable film in which a resin and a clay are mixed, and have found that a high-transparency film can be obtained particularly by using a synthetic clay (PTL 5). This high-transparency film is excellent in light transmittance, but a problem associated therewith is that because paste with water as a solvent is used for coating and the paste is repelled on lacquerware and the like, the film cannot be applied to lacquerware or the like.

PTL 6 indicates that a transparent coating layer can be obtained by introducing a phosphonium salt/imidazolium salt-based organically-modifying agent between layers of a synthetic clay and adding an epoxy resin with a bisarylfluorene skeleton as an organic binder. However, the problems associated with this method are that heating at 170° C. is required for polymerizing the epoxy resin, and the coating layer fades and is thermally deteriorated. Another problem is that when a plastic material is used as a base material, possible selection thereof is limited.

The inventors of the present invention have reported that transparent coating can be performed on a glass surface with a bar coater by using a paste containing an ultraviolet curable resin, an organically-modified synthetic clay and toluene (NPL (Non-Patent Literature 1)). This paste can be coated on glass with a bar coater without any problem, but when the paste is spray coated on the surface of lacquerware, cissing occurs, coating cannot be performed, and gloss drops.

CITATION LIST

Patent Literature

[PTL 1] Japanese Patent Application Publication No. 2005-179865: "Method for Producing Supporting Material for Heat Sensitive Mimeograph Printing Stencil Paper, and Stencil Paper".

[PTL 2] Japanese Patent Application Publication No. 2010-222453: "Japanese Lacquer and Method for Manufacturing Japanese Lacquer".

[PTL 3] Japanese Patent Application Publication No. 2002-30238: "Ultraviolet Ray Curing Ink for Stencil Printing".

[PTL 4] Japanese Patent Application Publication No. 2008-161856: "Method for Forming Coating Layer and Coated Molded Article"

[PTL 5] Japanese Patent Application Publication No. 2007-63118: "Transparent Film".

[PTL 6] Japanese Patent Application Publication No. 2008-50235: "Clay Thin Film, Method for Producing the Same, and Clay Thin Film Laminate".

[PTL 7] Japanese Patent No. 110460 (Specification): "New Decoration Method for Lacquerware".

[PTL 8] Japanese Patent Application Publication No. 2013-71933: "New Polyoxyalkylene Ammonium Salt and Antistatic Agent Containing the Same".

Non Patent Literature

[NPL 1] Abstracts of Presentations on the 58th Clay Science Symposium, pp. 40-41, Published on Sep. 24, 2014, 58th Clay Science Symposium Executive Committee.

SUMMARY OF INVENTION

[Subject to be Solved by the Invention]

It is an object of the present invention to provide a coating agent which is capable of tightly adhering to the lacquerware surface with sufficient strength as a result of low-temperature treatment and has hard coat properties, durability against washing in a dishwasher or the like, transparency, ultraviolet resistance, and ultraviolet blocking property, and also to provide a protective film using the coating agent, and a product to which the protective film is applied.

[Means to Solve the Subject]

Next, the present invention will be described in more detail.

The inventors of the present invention have found that where a mixed solvent obtained by adding xylene and butyl acetate to toluene is used as a solvent for a coating agent when the coating agent containing an ultraviolet curable resin and an organically-modified synthetic clay is applied onto a coating layer, the coating agent can be more uniformly applied to the coating layer than when pure toluene is used. Further, as a result of detailed investigation of coating conditions and the like, it was found that a uniform glossy protective layer that does not impair the appearance of the craft product can be applied to the surface of various kinds of coating layers of various three-dimensional shapes by spray coating. These findings led to the completion of the present invention.

In the present invention, a nanocomposite coating layer obtained as a result of a process of using a mixed coating agent containing a clay, a resin, and an organic solvent, applying the coating agent by a spray coating method to a material to be coated, and then drying and curing demonstrates a surface hardness of 3H or higher and ultraviolet resistance and has a configuration completely different from that obtained by the conventional techniques.

In the present invention, by producing a structure in which an ultraviolet absorber as an organic molecule is sandwiched between clay crystals, it becomes possible to stably perform high loading of the ultraviolet absorber. Such a conception can be realized for the first time by forming a nanocomposite structure of clay and resin. The present invention is the first attempt to impart scratch resistance, ultraviolet resistance and durability by coating a protective film containing inorganic nanoparticles such as clay on the coated surface of the conventional lacquerware, and the technique of the present invention is clearly different from the conventional techniques.

A material obtained by homogeneously mixing inorganic nanoparticles in a resin is called an inorganic-organic nanocomposite. In this case, setting the size of the particles present in the resin to 20 nm or less is a condition necessary for realizing a layer with a clear appearance without white turbidity. The thickness of plate crystals of clay is about 1 nm, and even when the clay is organically modified, the thickness is about 3 nm, so that the thickness can be made less than 20 nm when the clay crystals are completely separated. Therefore, it is important to find a combination of a solvent and an organically-modified clay such that the clay has high compatibility with the solvent and the clay crystals are completely separated in the solvent. In this case, it is preferable to use a synthetic clay containing no colored impurities. It is desirable that smectite which can be exchanged for organic ions be used as the clay. The dispersibility in a solvent also differs depending on the type of the organically-modifying agent, and for a solvent ensuring easy dispersion, the organically-modifying agent can be designed to obtain the dispersibility in the target solvent. The present invention uses the inorganic-organic nanocomposite technique for uniformly mixing inorganic nanoparticles in a resin.

The inventors of the present invention have previously found that a transparent hard coat layer adhesively bonded to glass can be obtained by using a coating agent prepared by mixing an organically-modified synthetic clay, an ultraviolet curable resin, and a curing agent in pure toluene, coating the coating agent on glass, drying, and irradiating with ultraviolet radiation. However, in order to apply the coating agent to a product having a three-dimensional shape, spray coating or the like needs be used, but the problem faced by the inventors is that where the same coating agent is used, opacity occurs and a coating with excellent light transmittance cannot be obtained.

Accordingly, the inventors of the present invention diligently and repeatedly conducted experiments by changing the type of solvent and investigating the proportions of solvent, resin, and clay and have discovered a viscous coating agent which can be spray-coated and a protective film which can be obtained from the coating agent and has extremely high light transmittance, high surface hardness and excellent ultraviolet blocking property. Furthermore, a product was produced by spray coating on a three-dimensional surface and the production conditions such as spray operation conditions and drying conditions were also diligently investigated, and the product was confirmed to have a high degree of completeness such that the appearance thereof could not be distinguished from that without the protective film. This finding led to the completion of the present invention.

In the present invention, a product having scratch resistance and durability against washing in a dishwasher is realized by applying a strong inorganic-organic nanocomposite film in which a transparent resin and an organically-modified synthetic clay are mixed as a protective film to a coating layer (FIG. 1). In addition, as a result of including a substance absorbing ultraviolet radiation, the protective film functions as an ultraviolet absorbing layer, delays fading of the dye contained in the coating layer, and improves ultraviolet resistance of the product. In this case, the protective film is disposed on the coating layer, and the coating layer and the protective film are tightly bonded and do not peel off easily. Further, the coating layer may be formed of several constituent layers which are exemplified by an undercoat layer, a silver-seeded layer, and a semi-transparent layer, in the order from the lower portion (FIG. 2). The coating layer is further disposed on a base material, and the coating layer and the base material are tightly bonded and do not peel off easily.

<Configuration and Required Performance of Surface Protective Film>

The protective film formed by the coating agent of the present invention is coated on the surface of a coating layer as shown in FIG. 1, and the protective film is formed as an inorganic-organic nanocomposite layer formed from a resin and an organically-modified synthetic clay. This protective film needs to be sufficiently transparent. For example, when the protective film is coated on an iridescent coating surface, the protective film needs to be strongly adhered to the iridescent coating surface and not to be easily peeled off. Furthermore, the protective film needs to have a high surface hardness and not to be easily scratched, and also to have a capability of absorbing ultraviolet radiation. For example, when the protective film is coated on an iridescent coating surface, the protective film needs to improve the durability of the iridescent coating against ultraviolet radiation. The protective film also needs not to be scratched and needs to show no changes in color tone or the like even when repeatedly washed in a dishwasher.

The iridescent coating is obtained by applying a coating layer having characteristics such as shown in FIG. 2 to a base material. The coating layer includes an undercoat layer, a silver-seeded layer, a semitransparent layer in this order, and the semitransparent layer includes a dye such as blue, red, green, or black (PTL 7).

<Film Forming Process>

The protective film is applied according to the preparation process shown in FIG. 3. Experiments were conducted by mixing a solvent and an ultraviolet-curable resin, further adding an organically-modified synthetic clay, mixing and dispersing to obtain a uniform coating agent, coating the coating agent with a bar coater or by spray coating on a coating layer or on a slide glass, and carrying out ultraviolet radiation polymerization with an ultraviolet irradiation device. In the case of spray coating, auxiliary addition of a solvent is carried out, if necessary, in order to flatten the coated surface.

<Requirements for Particle Refinement>

In the present invention, a transparent protective film needs to be formed in order to achieve the object of the invention. Therefore, the inorganic material needs to be smaller than 30 nm and needs to be homogeneously dispersed in the organic material. When the inorganic material is larger than 50 nm in size, the appearance generally becomes whitened (high haze), and the object of the present invention cannot be achieved. Such a nanocomposite structure can be obtained with delaminated smectite dispersed in a state of small particles. Natural smectite includes colored impurities such as iron, but synthetic smectite does not include colored impurities such as iron, so synthetic smectite becomes a raw material for a coating agent to obtain a transparent appearance. However, since synthetic smectite is not dispersed in an organic solvent as it is, synthetic smectite is mixed with a coating agent using an organic solvent by performing a pretreatment called "organic modification", such as dispersing in the organic solvent.

Specifically, the present application provides the following invention.

That is, the present invention has the following features [1] to [16].

[1] A coating agent containing an organically-modified synthetic clay, a resin, and an organic solvent, wherein the organic solvent is in the range of 5 parts by weight to 70 parts by weight with respect to 30 parts by weight of the resin, and the organic solvent contains two or more selected from the group consisting of toluene, xylene, ethylbenzene, ethyl acetate, butyl acetate, and methyl isobutyl ketone.

Further, in one embodiment of the coating agent of the present invention,

[2] the organically-modified synthetic clay contains polyoxypropylene methyl diethyl ammonium.

Further, in one embodiment of the coating agent of the present invention,

[3] the organically-modified synthetic clay is in the range of 1 part by weight to 25 parts by weight with respect to 30 parts by weight of the resin.

Further, in one embodiment of the coating agent of the present invention,

[4] the resin is an ultraviolet-curable resin.

Further, in one embodiment of the coating agent of the present invention,

[5] an organic compound that absorbs ultraviolet radiation is contained.

The present invention also relates, in another aspect, to

[6] a protective film prepared using the coating agent according to any one of [1] to [5] hereinabove.

Here, in one embodiment of the protective film of the present invention,

[7] when a reinforced coating layer having the protective film according to [6] is prepared on the surface of the coating layer, a color difference $\Delta E^*ab$ between the coating layer and the reinforced coating layer is 1.6 or less.

Further, in one embodiment of the protective film of the present invention,

[8] when a reinforced coating layer having the protective film according to [6] is prepared on the surface of the coating layer, a difference in a G value, which is an index relating to a gloss, between the coating layer and the reinforced coating layer is 20 or less.

The present invention also relates, in another aspect, to

[9] a reinforced coating layer including a coating layer coated on the surface of a base material, and the protective film according to any one of [6] to [8] coated on the surface of the coating layer.

Here, in one embodiment of the reinforced coating layer of the present invention,

[9'] the coating layer and the protective film strongly and tightly adhere to each other and do not peel off in a cross-cut tape test.

In one embodiment of the reinforced coating layer of the present invention,

[10] the pencil hardness is 3H or more.

The present invention also relates, in another aspect, to

[11] a product having the reinforced coating layer according to [9] or [10] on the surface of at least a part of a base material constituting the product.

Here, in one embodiment of the product of the present invention,

[12] the base material is at least one selected from the group consisting of glass, ceramics, plastics, metals, and wood molded materials.

Further, in one embodiment of the product of the present invention,

[13] the coating layer is formed of a plurality of layers including a silver-seeded layer and a semitransparent layer, the silver-seeded layer is formed as a layer positioned between the base material and the semitransparent layer, and a dye is contained in the semitransparent layer.

In addition, in one embodiment of the product of the present invention,

[14] a main component of the semitransparent layer is a urethane resin, a cashew resin, or a lacquer.

In addition, in one embodiment of the product of the present invention,

[15] a color difference $\Delta E^*ab$ between before and after 100 cycles of washing with a detergent in a dishwasher is 1.6 or less.

In addition, in one embodiment of the product of the present invention,

[16] a color difference $\Delta E^*ab$ between before and after 1 h of irradiation with ultraviolet radiation of a wavelength of 365 nm and an intensity of 12,000 $\mu W/cm^2$ is 1.6 or less.

Advantageous Effects of Invention

According to the present invention, the following special effects are exerted.

(1) According to the present invention, it is possible to provide a coating agent containing a clay, a resin, and an organic solvent, a protective film using the coating agent, and a product to with the protective film is applied.

(2) With the coating agent of the present invention, it is possible to form a protective film which tightly adheres to the surface of lacquerware or the like with sufficient strength as a result of low-temperature treatment and has hard coat properties, durability against washing in a dishwasher or the like, transparency, ultraviolet resistance, and ultraviolet blocking property.

(3) In particular, the coating agent of the present invention can be coated without causing cissing even when spray coating is used and maintains excellent light transmittance.

ASPECT TO ENFORCE THE INVENTION

<Selection of Organically-Modified Synthetic Clay>

Figure 1:
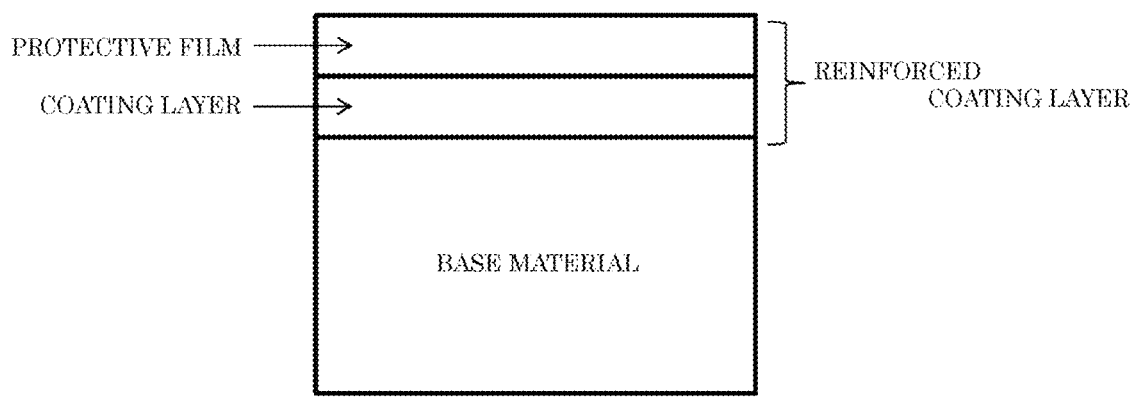
FIG. 1 shows an embodiment of a product for which the protective film of the present invention is used. The protective film of the present invention is coated on a coating layer to form, together with the coating layer, a reinforced coating layer on a base material.
Figure 2:
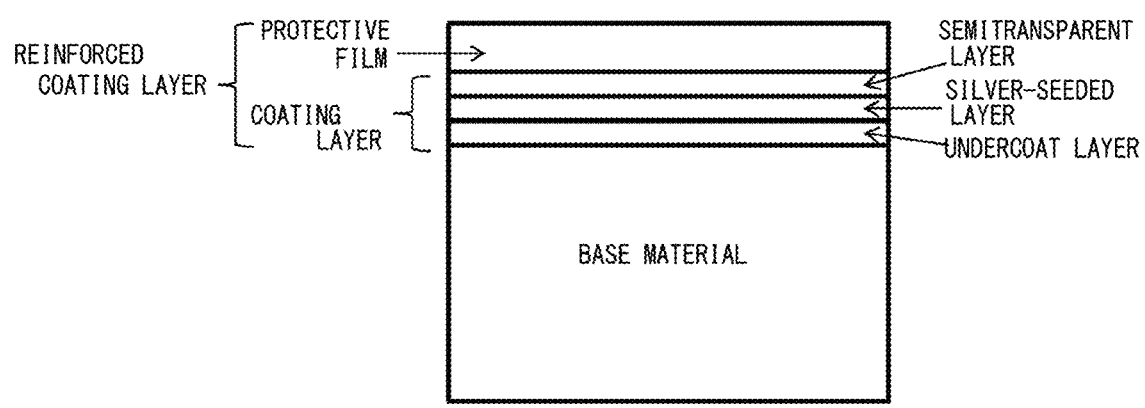
FIG. 2 shows an embodiment of a product for which the protective film of the present invention is used in the case in which the coating layer is formed of a plurality of layers including an undercoat layer, a silver-seeded layer, and a semitransparent layer.
Figure 3:
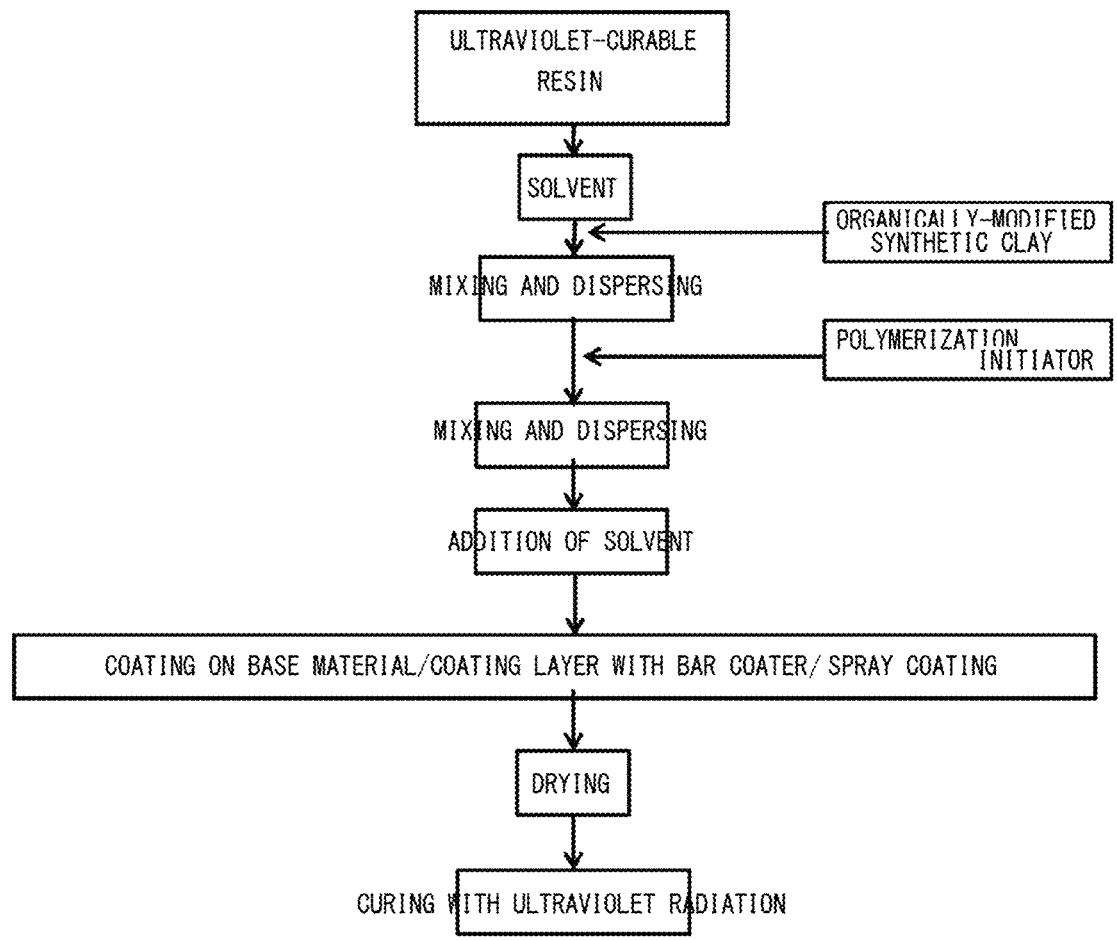
FIG. 3 shows a flowchart of an embodiment of a process for forming a protective film on a base material or a coating layer by using the process for producing a coating agent of the present invention and the coating agent.
Figure 4:
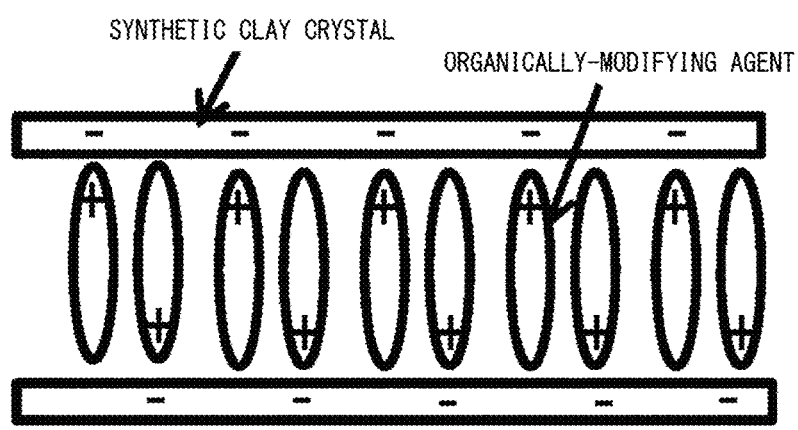
FIG. 4 is a schematic diagram of the microstructure of an organically-modified synthetic clay formed from synthetic clay crystals and an organically-modifying agent; in the figure, the thickness of the synthetic clay crystal is about 1 nm.

The organically-modified synthetic clay has the structure shown in FIG. 4 in which an organically-modifying agent is sandwiched between layers of synthetic clay crystals having a thickness of about 1 nm. The organically-modifying agent is generally a cationic surfactant, but the organically-modifying agents can vary in the number of organic chains and the length and structure of the organic chains, thereby changing the properties of the organically-modified synthetic clay. In the present invention, the following investigation was carried out in order to select the organically-modified synthetic clay.

An organically-modified synthetic clay was dispersed by shaking in a solvent for a certain period of time and then allowed to stand, and the state of the clay was observed. The following five types of organically-modified synthetic clays manufactured by Co-op Chemical Co., Ltd. were used. In these organically-modified clays, various organically-modifying agents were introduced in advance into synthetic smectite.

Trade name of synthetic organic clay: organically-modifying agent contained

Lucentite SAN: dimethyl distearyl ammonium
Lucentite SAN316: dimethyl distearyl ammonium
Lucentite SEN: dihydroxyethyl methyl dodecyl ammonium
Lucentite SPN: polyoxypropylene methyl diethyl ammonium
Lucentite STN: methyl trioctyl ammonium As a result of evaluation, it was understood that among the five types of clays, Lucentite SPN manufactured by Co-op Chemical Co., Ltd. has the organically-modifying agent with the largest number of carbon atoms, demonstrates the highest transparency, shows no precipitation, and excels in dispersivity in toluene or a thinner including toluene. For this reason, it was decided to use SPN in subsequent experiments.

Incidentally, it is expected that the present organically-modifying agent has an antistatic function (PTL 8). Therefore, by the addition of SPN, an effect of suppressing cissing due to static electricity at the time of coating can be expected.

<Selection of Resin>

First, thermosetting resins were investigated as the resin. Thus, three representative epoxy resins were tested. The heat treatment temperature was 80° C. in consideration of the heat resistance of the base material. As a result, a level of pencil hardness of 3H which is a standard for a general hard coat could not be reached with any of the epoxy resins. Next, ultraviolet-curable resins were investigated. Ultraviolet-curable resins can be of an epoxy cation-polymerized system and an acrylate radical-polymerized system, and the latter group can be further roughly divided into epoxy-modified acrylates, urethane-modified acrylates, and silicone-modified acrylates. Among them, urethane-acrylate ultraviolet-curable resins were investigated as materials suitable for a hard coat which is the object of the present invention.

Urethane-acrylate ultraviolet-curable resins Purple-Light UV-7605B, UV-1700B, and UV-7640B manufactured by the Nippon Synthetic Chemical Industry Co., Ltd. were used, and a resin suitable for the object of the present invention in terms of hardness and the like was selected. As the solvent to be used, toluene suitable for the organically-modified clay Lucentite SPN, which was to be used, was used. Here, the ratio of resin to toluene is exemplified by 30:70. A bar coater having a wet thickness of 50 micrometers to 150 micrometers was used so as to ensure an optimum thickness for the resin, and the thickness of the protective film was set to 5 micrometers to 10 micrometers.

The relationship between the transparency of the coating layer and the solvent (a thinner exemplified by toluene or a thinner including xylene and ethylbenzene which are components with a boiling point higher than that of toluene), presence or absence of additional dilution, and drying conditions was investigated. In all the experiments, the total light transmittance and the like were measured with a haze meter (Hazemeter NDH 5000 manufactured by Nippon Denshoku Industries Co., Ltd.) with respect to a sample obtained by coating with a bar coater on a slide glass.

The pencil hardness test has confirmed that curing with ultraviolet radiation can be performed when the solvent is toluene and also when the solvent is a thinner including toluene as the main component (a mixed solvent of toluene, xylene, and the like) which is used for spray coating. Further, the total light transmittance was 90% or more of the target value, and a film with sufficient transparency could be obtained.

With UV-1700B, it was found that the target level of 3H was not reached. Meanwhile, with UV-7640B and UV-7605B, it was found that a hardness of 3H or more could be realized.

<Polymerization Initiator>

There are radical photopolymerization initiators and cationic photopolymerization initiators, and the former include alkylphenone photopolymerization initiators, acylphosphine oxide photopolymerization initiators, titanocene photopolymerization initiators, oxime ester photopolymerization initiators, and the like. Cationic photopolymerization initiators are exemplified by an iodonium salt system and a sulfonium salt system.

In the current investigation in the present invention, 2-hydroxy-2-methylpropiophenone manufactured by Tokyo Chemical Industry Co., Ltd. was used as a radical photopolymerization initiator, but the investigation was not limited thereto. Regarding the amount, it was found that a hardness of 3H or more was realized for both 7640B and 7605B when the initiator was added in an amount of 6.0 g, that is, five times the standard addition amount which is 1.2 g. It was also found that when the amount of the initiator was increased to 10 times, a hardness of 3H sometimes could not be reached with 7605B. An appropriate addition amount is exemplified by 1 time to 10 times the standard addition amount.

The reason why the amount of the initiator is required to be larger than the standard addition amount is considered hereinbelow. The polymerization initiator is adsorbed in a large amount to the organically-modifying agent between the crystals of the organically-modified synthetic clay. For this reason, the polymerization initiator is not present in the resin proportionally to the addition amount thereof. This is apparently why polymerization does not proceed even when the standard addition amount of the initiator is added. Further, since the polymerization initiator is contained at a high concentration between the organically-modified synthetic clay layers, the polymerization initiator effectively functions as an ultraviolet absorber and is expected to have an effect of improving the ultraviolet absorption performance of the protective film. In addition, since the resin and the polymerization initiator are not mixed that much, an effect of suppressing the deterioration of the resin caused by ultraviolet irradiation can be expected.

Figure 5:
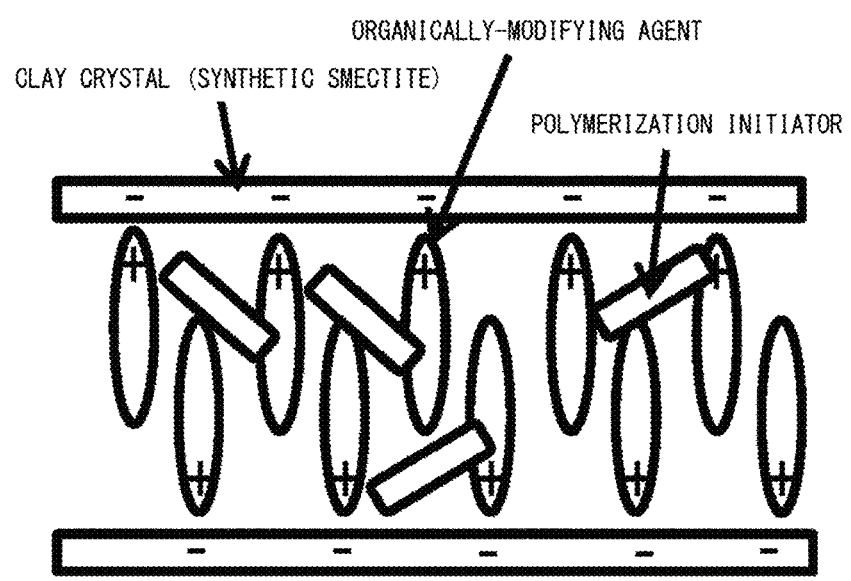
FIG. 5 is a schematic diagram of the microstructure of an organically-modified synthetic clay formed from synthetic clay crystals (synthetic smectite), an organically-modifying agent, and a polymerization initiator; a structure is shown in which the polymerization initiator is incorporated into the organically-modified synthetic clay.
Figure 6:
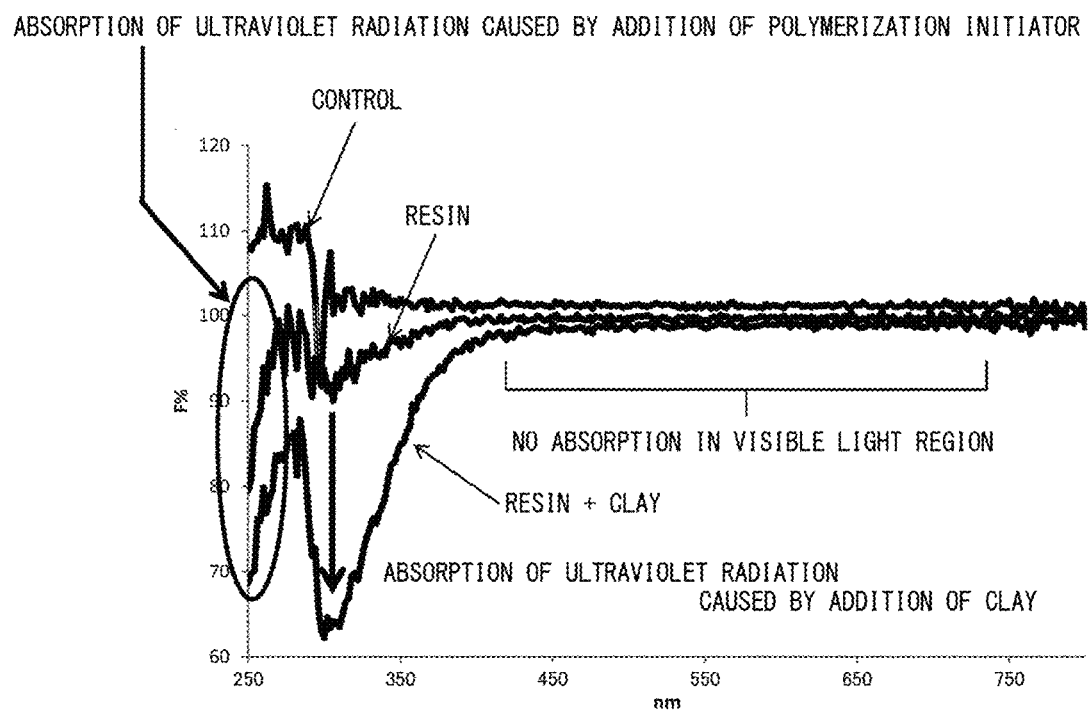
FIG. 6 shows ultraviolet-visible absorption spectra of a resin alone (indicated as "CONTROL" in the figure), a mixture obtained by adding a polymerization initiator to the resin (indicated as "RESIN" in the figure), and a mixture obtained by adding the polymerization initiator and an organically-modified synthetic clay to the resin (indicated as "RESIN+CLAY" in the figure).

The structure shown in FIG. 5 was also confirmed by measuring the ultraviolet-visible absorption spectrum of the protective film. FIG. 6 shows the ultraviolet absorption spectra of protective films measured by a reflection method. In the protective film to which the polymerization initiator is added in an amount which is five times the standard addition amount (FIG. 6: RESIN), there is a large absorption peak around the wavelength of 250 nm, as compared with the protective film to which the polymerization initiator is added in the standard addition amount (FIG. 6: CONTROL). Further, for the resin of a sample to which the organically-modified synthetic clay is added (FIG. 6: RESIN+CLAY), a large absorption peak around 300 nm is present in addition to the absorption at 250 nm. This peak is observed when the concentration of the polymerization initiator is high, indicates that the polymerization initiator locally exists at a high concentration due to the addition of the claim, and supports the structure shown in FIG. 5.

In the current experiment in the present invention, the viscosity of UV-7605B was considerably higher than that of UV-7640B, and the resultant problem was that UV-7605B had to be diluted with a solvent at the time of spray coating. For this reason, UV7640B was used. The ultraviolet irradiation time of 1 min is too short and no curing occurs. The appropriate irradiation time is 10 min to 20 min. Where the irradiation time is too long and the irradiation is performed for 1 h or more, problems such as yellowing or embrittlement of the resin may occur.

As indicated hereinabove, it was confirmed that a pencil hardness of 3H or more can be obtained even in the case of adding clay to the ultraviolet curable resin UV-7640B. Also, in the current experiment in the present invention, it was shown that the polymerization initiator has an ultraviolet absorbing effect, but it is also possible to use a commonly used ultraviolet absorber or the like.

<Selection of Solvent>

The solvent to be used may be any solvent as long as it exhibits good dissolving/dispersing properties with respect to both the ultraviolet-curable resin and the organically-modified synthetic clay, and a solvent containing two or more selected from the group consisting of toluene, xylene, ethylbenzene, ethyl acetate, butyl acetate, and methyl isobutyl ketone can be used. A solvent containing toluene and xylene or ethylbenzene is preferred, and a solvent containing toluene, xylene, and ethylbenzene is more preferred. It was found that a protective film formed using any of these solvents can be cured by ultraviolet radiation.

The selection of solvent is not easy and cannot be based on general knowledge. Thus, elongation and adhesiveness to the surface of the product need to be confirmed, and ultimately it is necessary to confirm that the product level can be obtained.

Accordingly, pure toluene and a thinner obtained by mixing toluene with a solvent with a boiling point higher than that of toluene were used and the leveling properties of the two solvents were compared. A solvent suitable for spray coating and also satisfactory in terms of flat surface finish after coating was the thinner.

Mixed organic solvents such as thinners are commonly used in organic solvent jobs such as painting, printing, and adhesive bonding. Thinners are prepared by mixing several kinds of organic solvents with different performance for the purpose of improving dissolving ability, evaporation characteristics, viscosity (extensibility) and the like by a synergistic effect, more specifically by mixing the following components at an appropriate ratio according to the application:

1. a main solvent having strong solvency with respect to a solute 2. a co-solvent to enhance the solvency of the main solvent 3. a diluent that reduces the viscosity and improves workability 4. in the case of a paint thinner, an evaporation inhibitor (retarder) for suppressing sudden evaporation and preventing whitening (blushing) of the coating film by condensation of moisture in the air.

In the present invention, by adding o-xylene (boiling point 144.4° C.) and ethylbenzene (boiling point 136° C.), which are components with a boiling point higher than that of toluene, to toluene (boiling point 110.63° C.) used as a main solvent and using the mixture as an evaporation inhibitor, it is possible to obtain a coated surface with higher flatness when spray coating is performed. It is also possible to use ethyl acetate (boiling point 77.1° C.), butyl acetate (boiling point 126° C.), and methyl isobutyl ketone (boiling point 116.5° C.)

<Weight Ratio of Resin, Solvent and Clay>

The number of parts by weight of the organic solvent with respect to 30 parts by weight of the resin can be within the range of 5 to 70. Further, the number of parts by weight of the organically-modified synthetic clay with respect to 30 parts by weight of the resin can be within the range of 1 to 25, more preferably in the range of 1 to 5.

The number of parts by weight of the organic solvent is preferably about 46 times or less that of the clay. Where the organic solvent is contained in a proportion larger than the abovementioned number of parts by weight with respect to the clay, cissing tends to occur at the time of spray coating, which is undesirable.

Specifically, the amount of clay added to the coating agent and the viscosity of the liquid were investigated, and when the amount of the organically-modified clay added to the ultraviolet-curable resin was changed and the following operations were performed, the following viscosity of the coating agent was obtained. When an amount of organically-modified synthetic clay exceeding 2.5 g was added to 7 g of the solvent and 3 g of the resin, gelation of the coating agent was promoted and the coating agent was impossible to shake. When the amount of the organically-modified synthetic clay became 3.0 g or more, the liquid stopped moving. It was thus found that the addition proportion of the organically-modified clay that enabled shaking was at maximum 2.5 g as the addition amount of clay to 3 g of the resin and 7 g of the solvent. Further, from the standpoint of handleability, it was decided to prepare a coating agent with the amount of the organically-modified synthetic clay added being 2.1 g or less.

<Coating of Coating Agent>

Conventionally known methods such that use a bar coater, brush coating, spraying, immersion, a flow coater, a knife coater, a spin coater, and the like can be used as a method for coating the coating agent of the present invention on a base material. In this case, a preferred form such as a paste form or a liquid form can be selected for the coating agent according to the coating method. After the coating agent of the present invention is coated on various base materials, the coating is dried by a known method such as allowing the coating to stay at room temperature or drying by heating.

<Drying Conditions>

For the process of drying the solvent, a method of drying with a dryer is also used. Since there is a possibility that dust may stick when the coated base material is moved to a dryer, a method of drying in a room even if it takes some time is also used. In the present invention, it was decided to investigate drying at room temperature and oven drying. Even if the drying rate is too high, the coated surface is roughened due to the generation of bubbles and the like. Therefore, suitable drying is at a temperature of 60° C. or less. It was found that when drying at 60° C., sufficient drying can be performed in 3 min. When drying at room temperature, the drying time is 1 h to 24 h. As indicated hereinabove, it was found that when a protective film was applied by changing the drying conditions, a protective film having sufficient hardness could be prepared.

<Spray Coating>

Initially, there was no problem at the time of film formation with the bar coater, but when a solvent was added for the purpose of lowering the viscosity at the time of spray coating, it was observed that gloss was not sufficiently obtained. Accordingly, tests were conducted in which the amount of clay added was reduced from 21 g to 3 g for the purpose of lowering the viscosity of the coating liquid. Also, pure toluene has a high drying rate, which causes whitening. Therefore, it was decided to use a mixed solvent including a high-boiling-point solvent to delay drying.

The scratch resistance was evaluated when 3.0 g of the ultraviolet-curable resin was used with respect to 3 g of the organically-modified synthetic clay. At this time, each sample was prepared by applying a black iridescent layer (urethane resin) to a slide glass, and a protective film was applied by spray coating. The result was a pencil hardness of 4H to 5H, that is, higher than 3H, which is a level called a general hard coat, and sufficient scratch resistance was demonstrated. This result is consistent with the result obtained with a bar coater.

Meanwhile, it was determined that the black iridescent surface without the protective film had a pencil hardness of F to H. As described above, the use of a mixed solvent including a high-boiling-point solvent when performing spray coating caused no problems in appearance, and it was confirmed that scratch resistance was sufficiently improved by the application of the protective film.

<Coating Thickness>

The coating thickness of the protective layer is preferably 50 micrometers or less and 5 micrometers or more. Problems arising when the protective layer is thicker than 50 micrometers are that the surface flatness deteriorates, the transparency is decreased, and time is required for ultraviolet irradiation. Meanwhile, a problem arising when the protective layer is thinner than 5 micrometers is that the protective effect such as scratch resistance and ultraviolet resistance is reduced.

<Base Material>

In the present invention, glass, ceramics, plastics, metals, and wood molded materials can be advantageously used for the base material. Although paper exhibits ultraviolet resistance, because the paper itself is soft, it is difficult to exhibit hard coat properties.

<Coating Layer Surface Material>

A coating layer to which the coating agent of the present invention can be applied is not particularly limited, and known coating layers such as iridescent coating, urethane, acryl, epoxy, silicone, fluororesin, and the like coated on the base material surface can be used.

The iridescent coating uses cashew, urethane, or a lacquer. Black and blue are urethane, red and green are cashew. A change in surface hardness caused by application of a protective film to a sample obtained by coating a urethane resin (black), a cashew resin (red), and a lacquer (brown) on a slide glass was evaluated.

The pencil hardness of the cashew resin (red) was evaluated as HB to B and the pencil hardness of the urethane (black) was evaluated as F to H, whereas the pencil hardness of the lacquer was evaluated as F and found to be low. When the protective film was applied, it was confirmed that the surface hardness was improved to 3H for all of the coating layers.

From the abovementioned results, it was found that the protective film has an effect of increasing the hardness of the soft surface for all of urethane, cashew, and lacquer. It was also shown that such an effect of improving the surface hardness can be realized also when spray coating is used as a process.

<Criteria for Color Change Evaluation>

Here, a color difference ΔE*ab which is automatically measured and calculated with a color difference meter is taken as an index for the target value of the color difference in the present invention. The meaning of the index is ΔE*ab<1.6 which, according to Nippon Denshoku Industries Co., Ltd., corresponds to an AA grade tolerance difference and is considered as "a level at which a color difference is slightly felt in adjacent color comparison; a range of tolerance color difference including a device difference between typical colorimeters". It can be said to be a reasonable target value from the viewpoint of color management without the origination of claims in the process of product management, which is the object of the present invention.

<Ultraviolet Resistance>

Individual evaluation of the color change in the protective film and the iridescent coating layer was carried out for evaluating ultraviolet resistance. Ultraviolet resistance was evaluated by using glass made of quartz that transmits ultraviolet radiation, applying a protective film thereonto, and irradiating with ultraviolet radiation in a state in which the protective film was placed on an iridescent layer. It was confirmed that the coating could be applied to about 10 micrometers as the thickness of the protective film which was calculated by using the measurement value of the specific gravity and data on weight increase caused by the coating.

Ultraviolet irradiation was carried out for 1 h to 5 h by using a Handy Cure Lab HLR100T-2 (intensity 12,000 μW/cm$^2$, wavelength 365 nm) manufactured by SEN LIGHTS Corporation, and the color change was evaluated with a color difference meter. When converted to ultraviolet exposure amount in outdoor environment per 1 h under this condition, an acceleration test corresponding to 2.6 years in the room is obtained. First, only the protective film was subjected to ultraviolet irradiation for 5 h, but no change in color was recognized with the naked eye, and the ultraviolet resistance of the protective film was found to be high. In the case of the protective film containing an organically-modified synthetic clay, the target value ΔE*ab<1.6 was reached within 3 h of irradiation.

<Color Change Caused by Ultraviolet Radiation>

As a result of evaluating the color change of a black iridescent layer caused by ultraviolet radiation, the effect of reduced color change was confirmed for a black iridescent layer on which quartz glass with an organically-modified synthetic clay was placed. Furthermore, color change under ultraviolet irradiation was also measured for a sample obtained by directly spray-coating a protective film on a glass having a black iridescent layer, but the color difference of <1.6, which is the target, was achieved even after 5 h.

To grasp the suitability for iridescent coatings of various colors such as blue, green, and red, protective films with and without an organically-modified synthetic clay were directly coated with a bar coater on postcards obtained by using paper as a base material and coating blue, green and red iridescent paints thereon, a total of three types of postcards (two postcards with the protective films with and without the organically-modified synthetic clay, and one postcard without the coating) were simultaneously irradiated with ultraviolet radiation, and color change was measured. The color difference was measured after 1 day from the irradiation. As a result, all the color changes were in the order of no film>film without organically-modified synthetic clay>film with organically-modified synthetic clay, and the effect of adding the organically-modified synthetic clay was confirmed. Also, the color change increased in the order of blue>green>red. For green and red, the color difference was smaller than 1.6 after the postcards were irradiated for 1 h and allowed to stand.

For blue, the target value of 1.6 was exceeded after 1 h, but since the color unevenness of the postcard was large, it was determined that it is necessary to increase the reliability of the accuracy of the results. Therefore, it was decided to perform the test for a blue color again with a sample using glass with smaller color unevenness as a base material.

Color differences were measured at the same time by performing ultraviolet irradiation on three types of samples, namely, a sample with no film on green iridescent glass, a film containing no organically-modified synthetic clay coated with a bar coater, and a film with an organically-modified synthetic clay. The composition of the coating agent at this time included 3 g or 0 g of organically-modified synthetic clay and 6 g of polymerization initiator in 30 g of resin and 70 g of solvent. As a result, the films containing the organically-modified synthetic clay showed the smallest color change and the effect of clay addition could be confirmed. As described above, as a result of testing on glass, the target value ΔE*ab<1.6 was achieved even in blue after 1 h irradiation.

<Evaluation of Adhesiveness>

A tape peeling test was carried out on protective films having a composition including 3 g or 0 g of organically-modified synthetic clay and 6 g of polymerization initiator in 30 g of resin and 70 g of solvent and applied with a bar coater. As a result, peeling of the protective films was not observed and the films were determined to have passed the tape peeling test. Next, no peeling was observed in the tape peeling test also for a sample in which a liquid containing 3 g of an organically-modified synthetic clay with respect to 30 g of the resin was spray-coated, and the sample was determined to have passed the tape peeling test. In addition, when a cross-cut tape test (JIS K 5600) was performed on the same sample, no peeling was observed, the cross-cut tape test was classified as class 0, and adhesion of the protective film to the coating layer was found to be satisfactory. As a result of the test, class 0 was determined and sufficient adhesion was confirmed for each of glass, wood molded plate, and aluminum as the base material. Since the porcelain has almost the same surface texture as the glass, it is considered that the same result will of course be obtained for porcelain.

<Transparency of Protective Film>

Evaluation of pencil hardness and transparency was carried out on protective films having a composition including 0 g to 40 g of organically-modified synthetic clay and 6 g of polymerization initiator in 30 g of resin and 70 g of solvent and applied with a bar coater to a slide glass. For the film containing no organically-modified synthetic clay, cissing occurred and a sample could not be prepared. In this respect, the necessity of adding an organically-modified synthetic clay also became clear.

The total light transmittance and haze (degree of haze) of the film coated on the glass were confirmed. In the range of the mixing ratio of the resin and organically-modified synthetic clay of the present invention, it was found that the total light transmittance of the film exceeds the target value of 90% and the film has sufficient transparency regardless of the amount of clay added. The haze value of glass itself is about 0.4. These results indicate that a sufficiently high total light transmittance can be obtained in the range of 5 g to 40 g of the amount of clay added to 30 g of resin when coating with a bar coater.

<G Value as Evaluation Index of Gloss>

As a part of the esthetic evaluation, the measurement value "G value" corresponding to "gloss" was evaluated in a state with the coating layer applied. The G value is calculated by subtracting the value of the reflected light SCE which does not include specular reflected light from the value of total reflected light SCI including specular reflected light. The G value was measured with a spectral colorimeter CM-2600d manufactured by Konica Minolta, Inc. The incident angle was 8 degrees. The range of G values obtained using this apparatus is presented below.

Measurement Examples

| | |
|---|---|
| Sandpaper | 3 |
| Filter paper | 23 |
| Glossy plastic (black) | 100 |
| Matte aluminum | 172 |
| Glossy aluminum | >200 |

It follows from the above that a G value around 100 can be said to correspond to glossy plastic.

<Color Difference and G Value Difference Caused by Application of Protective Film>

Coating layers of various colors, specifically red, black, blue, purple, green, and the like, were applied to various base materials such as glass and aluminum, and the disclosed protective film was applied thereonto. The color difference caused by the application of the protective film at that time was summarized. In all cases, $\Delta E^*ab$ did not exceed 1.6, and no significant change in color caused by the application of the protective film was found for a wide variety of base materials and various colors.

The effect of thickness of different iridescent layers and the application of the coating layer on the G value of the sample was investigated. The thickness of the iridescent layer was about 27 μm to 46 μm, but this did not significantly affect the G value. A coating liquid was prepared by adding 3 grams to 21 grams of the organically-modified synthetic clay to 30 grams of the ultraviolet-curable resin, further solvent dilution was conducted, and the effect thereof was also studied. As a result, in both cases of no dilution (straight) and dilution, the G value increased with the decrease in the mixed amount of clay. It was found that gloss was observed when no clay was contained, but the coating liquid containing no clay at all was repelled and could not be coated on the black iridescent layer, a sample could not be prepared and data could not be acquired. Further, when the clay was contained, a G value of 99 at the maximum was obtained, and this result was very close to the representative value of 100 of the black glossy plastic, and although it was lower than the value of 110 of the black iridescent layer, it was understood that sufficient gloss was obtained. The G value difference caused by coating of the protective film was in the range of 11 to 16.

<Evaluation of Durability Against Washing in Dishwasher>

As a preparation for evaluating durability against washing, a general household dishwasher (NP-TR6 manufactured by Panasonic Corporation) was used for evaluation. Washing was carried out in a regular mode, in which the disinfection mist, washing and rinsing processes were carried out and no drying was performed. The temperature of hot water in washing was about 70° C. The washing time per cycle was about 30 min. The detergent used was Charmy Crysta (registered trademark) clear gel produced by Lion Corporation.

The samples were a black iridescent layer (urethane resin) coated on a slide glass, and a black iridescent layer/protective film sample (applied by spraying). A grip was used for fixing, and the sample was fixed horizontally, so as not to move, to the shelf attached to the dishwasher. Washing was carried out 20 times, 60 times, 100 times in a regular mode in the dishwasher.

Since no appreciable change in appearance was observed in any of the post-washing samples, the protective film was determined to have durability against washing in a dishwasher.

<Color Difference and G Value Difference Between Before and after Dishwasher Test>

Samples prepared by applying an iridescent layer to a glass and spray coating a protective film containing 30 g of resin, 70 g of solvent, 3 g of organically-modified synthetic clay, and 6 g of initiator thereon (a sample with a thin iridescent coating, a sample with an iridescent coating of medium thickness, and a sample with a thick iridescent coating) were subjected to 20, 60, and 100 cycles of washing in the dishwasher. The samples were then taken out, and the change from the initial color was measured with a color difference meter. The color difference after 100 cycles of washing was 0.97 on average when there was no protective film and 0.76 when there was a protective film. Even after 100 cycles of washing, there was no case where $\Delta E^*ab$ exceeded 1.6. From this result, it was found that the protective film did not discolor even when repeatedly washed in a dishwasher.

The change in the G value was measured for the same samples. The G value of each glass tended to be slightly lower than that before the glass was placed in a dishwasher. The difference was 2 when there was no protective film and 4 when there was a protective film. The difference was slightly larger with the protective film, but in terms of appearance, the change was hardly noticeable.

<Relationship Between Clay Addition Ratio to Resin and G Value>

Evaluation was conducted on the relationship between the thickness of iridescent coating, which was a coating layer, the clay addition amount in the coating agent, presence/absence of solvent dilution, and G value. The smaller was the clay addition amount, the higher was the G value. The G value tended to increase with the decrease in the thickness of the coating layer, but this was apparently because when the iridescent coating, which was a coating layer, was thin, the silver-seeded layer became close to the surface and a metallic gloss effect was added. The protective film was found to have a G value close to the gloss of 100 of the glossy plastic level although the gloss of the black iridescent coating was not reached.

<Trial Product>

A coating agent containing 1.5 g of organically-modified synthetic clay with respect to 30 g of resin was prepared in the following manner. An ultraviolet-curable resin was placed in a solvent and mixed homogeneously by shaking. Then, an organically-modified synthetic clay was added and mixed homogeneously by shaking. A polymerization initiator was further added and mixed homogeneously by shaking. A coating agent was thus prepared. By using this coating agent, a glass sake cup could be coated without causing cissing. The result of naked-eye evaluation of the appearance of the sake cup, which was spray-coated with the coating agent, was satisfactory.

Based on many investigations, it was determined that a certain level was reached for the technique of applying a protective film of an inorganic-organic composite material by spray coating on an iridescent coating layer. As a next step, trial production was carried out for a total of six products including a lipped bowl, a tumbler, an old-fashioned tumbler, a porcelain dish, and a porcelain small bowl in addition to the sake cup by using the developed coating agent. As a result, the protective film of the present invention could be evenly applied to various three-dimensional shapes. Some of the products were exhibited at the exhibition and evaluated by users at eating and drinking establishment. The evaluation results were satisfactory.

EXAMPLES

Hereinafter, the present invention will be specifically described with reference to examples and comparative examples, but the present invention is not limited thereto. Additions, omissions, substitutions, and other changes in the configuration are possible without departing from the spirit of the present invention.

Comparative Example 1

<Evaluation of Coating Layer>

A pencil hardness test in accordance with JIS K 5600 was performed on a urethane resin black iridescent layer coated on glass as a base material, and the hardness was determined as F. The G value was measured with a spectral colorimeter (spectral colorimeter CM-2600d manufactured by Konica Minolta, Inc.) and the result was 111, which was found to be on par with glossy plastic. A total of 100 cycles of washing was carried out with a dishwasher (NP-TR6 manufactured by Panasonic Corporation). Washing was performed in a regular mode, in which the disinfection mist, washing and rinsing processes were carried out and no drying was performed. The temperature of hot water in washing was about 70° C. The washing time per cycle was about 30 min. The detergent used was Charmy Crysta (registered trademark) clear gel produced by Lion Corporation. The color difference after 100 cycles of washing was 0.97, which was found to be within the AA-class tolerance range. The color difference after irradiation with an ultraviolet lamp (intensity 12,000 $\mu W/cm^2$, wavelength 365 nm) for 1 h was measured with a spectral colorimeter (spectral colorimeter CM-2600d manufactured by Konica Minolta, Inc.). The color difference $\Delta E^*ab$ was 0.16, which was found to be within the AA-class tolerance range.

Comparative Example 2

<Evaluation of Coating Layer>

A pencil hardness test in accordance with JIS K 5600 was performed on a cashew resin red iridescent layer coated on glass as a base material, and the hardness was determined as HB.

Comparative Example 3

<Evaluation of Coating Layer>

A pencil hardness test in accordance with JIS K 5600 was performed on a lacquer coated on glass as a base material, and the hardness was determined as HB.

Example 1

<Preparation of Reinforced Coating Layer>

A total of 30 parts by weight of an ultraviolet-curable resin (ultraviolet curable resin UV-7605B, manufactured by the Nippon Synthetic Chemical Industry Co., Ltd.) was added to 70 parts by weight of a solvent [Stron No. 2500 (contains toluene, xylene, butyl acetate, ethylbenzene), manufactured by Cashew Co., Ltd.], and shaken for about 1 h to dissolve the ultraviolet-curable resin in the solvent. Next, 3 parts by weight of an organically-modifying agent [Lucentite SPN (polyoxypropylene methyl diethyl ammonium chloride), organically-modified synthetic clay, manufactured by Co-op Chemical Co., Ltd.] was added and mixed and dispersed by shaking for about 1 h. Next, 6 parts by weight of an alkylphenone photopolymerization initiator (2-hydroxy-2-methylpropiophenone, manufactured by Tokyo Chemical Industry Co., Ltd.) was added as an initiator and dissolved by mixing and dispersing for 1 h. The surface of a urethane resin black iridescent coating layer coated on a glass as a base material was coated with the coating agent with a bar coater having a wet thickness of 500 micrometers. There was no cissing, and coating could be performed uniformly. Next, drying was carried out in an oven at 60° C. for 3 min and ultraviolet curing was performed for 15 min by using an ultraviolet lamp [Handy Cure Lab HLR100T-2 (intensity 12,000 $\mu W/cm^2$, wavelength 365 nm) manufactured by SEN LIGHTS Corporation].

<Evaluation>

When the tape peeling test was performed on the obtained reinforced coating layer, peeling was not observed, and it was determined that the sample passed the tape peeling test. Also, when the cross-cut tape test (JIS K 5600) was performed on the same sample, peeling was not observed, and the cross-cut tape test was classified as class 0. A pencil hardness test according to JIS K 5600 was performed and the pencil hardness was determined to be 3H.

The color difference between before and after the application of the protective film was measured with a spectral colorimeter (spectral colorimeter CM-2600d manufactured by Konica Minolta, Inc.), and the color difference $\Delta E^*ab$ was 0.27, which was found to be within the AA-class tolerance range. In order to evaluate the gloss of the reinforced coating layer, the G value was measured with a spectral colorimeter (spectral colorimeter CM-2600d manufactured by Konica Minolta, Inc.), and the result was 98.5, which was found to be on par with glossy plastic. A total of 100 cycles of washing was carried out with a dishwasher (NP-TR6 manufactured by Panasonic Corporation). Washing was performed in a regular mode, in which the disinfection mist, washing and rinsing processes were carried out and no drying was performed. The temperature of hot water in washing was about 70° C. The washing time per cycle was about 30 min. The detergent used was Charmy Crysta (registered trademark) clear gel produced by Lion Corporation. The color difference after 100 cycles of washing was 0.75, which was found to be within the AA-class tolerance range.

The color difference after irradiation with an ultraviolet lamp (intensity 12,000 $\mu W/cm^2$, wavelength 365 nm) for 1 h was measured with a spectral colorimeter (spectral colorimeter CM-2600d manufactured by Konica Minolta, Inc.). The color difference $\Delta E^*ab$ was 0.05, which was found to be within the AA-class tolerance range.

Example 2

<Preparation of Reinforced Coating Layer>

A reinforced coating layer was prepared in the same manner as in Example 1, except that the coating was applied to the surface of a cashew resin red iridescent coating layer coated on glass as a base material. There was no cissing, and coating could be performed uniformly.

<Evaluation>

When the tape peeling test was performed on the obtained reinforced coating layer, peeling was not observed, and it was determined that the sample passed the tape peeling test. Also, when the cross-cut tape test (JIS K 5600) was performed on the same sample, peeling was not observed, and the cross-cut tape test was classified as class 0. A pencil hardness test according to JIS K 5600 was performed and the pencil hardness was determined to be 3H. The color difference between before and after the application of the protective film was measured with a spectral colorimeter (spectral colorimeter CM-2600d manufactured by Konica Minolta, Inc.), and the color difference ΔE*ab was 0.44, which was found to be within the AA-class tolerance range. In order to evaluate the gloss of the reinforced coating layer, the G value was measured with a spectral colorimeter (spectral colorimeter CM-2600d manufactured by Konica Minolta, Inc.), and the result was 103.25, which was found to be on par with glossy plastic.

Comparative Example 4

<Preparation of Reinforced Coating Layer>

A reinforced coating layer was prepared in the same manner as in Example 1, except that the organically-modified synthetic clay was not added. There was no cissing, and coating could be performed uniformly.

<Evaluation>

The color difference after irradiation with an ultraviolet lamp (intensity 12,000 μW/cm$^2$, wavelength 365 nm) for 1 h was measured with a spectral colorimeter (spectral colorimeter CM-2600d manufactured by Konica Minolta, Inc.). The color difference ΔE*ab was 0.13.

Comparative Example 5

<Preparation of Reinforced Coating Layer>

A reinforced coating layer was prepared in the same manner as in Example 1, except that the coating method used spraying and no organically-modified synthetic clay was added. Cissing occurred and uniform coating could not be performed.

Example 3

<Preparation of Reinforced Coating Layer>

A reinforced coating layer was prepared in the same manner as in Example 1, except that the coating method used spraying, the number of parts by weight of the solvent was 66.5, and the addition amount of the organically-modified synthetic clay was 1.5 parts by weight. There was no cissing, and coating could be performed uniformly.

<Evaluation>

A pencil hardness test according to JIS K 5600 was performed on the obtained reinforced coating layer, and the pencil hardness was determined to be 3H.

Comparative Example 6

<Evaluation of Coating Layer>

The color difference after irradiation with an ultraviolet lamp (intensity 12,000 μW/cm$^2$, wavelength 365 nm) for 1 h was measured with a spectral colorimeter (spectral colorimeter CM-2600d manufactured by Konica Minolta, Inc.) with respect to a coating layer prepared in the same manner as in Comparative Example 1, except that the color of the iridescent coating was blue. The color difference ΔE*ab was 3.52, which was found to be within the B-class tolerance range.

Example 4

<Preparation of Reinforced Coating Layer>

A reinforced coating layer was prepared in the same manner as in Example 1, except that the color of the iridescent coating was blue and the drying was performed under room temperature conditions. There was no cissing, and coating could be performed uniformly.

<Evaluation>

When the tape peeling test was performed on the obtained reinforced coating layer, peeling was not observed, and it was determined that the sample passed the tape peeling test. Also, when the cross-cut tape test (JIS K 5600) was performed on the same sample, peeling was not observed, and the cross-cut tape test was classified as class 0. A pencil hardness test according to JIS K 5600 was performed and the pencil hardness was determined to be 3H. The color difference between before and after the application of the protective film was measured with a spectral colorimeter (spectral colorimeter CM-2600d manufactured by Konica Minolta, Inc.), and the color difference ΔE*ab was 0.577, which was found to be within the AA-class tolerance range. In order to evaluate the gloss of the reinforced coating layer, the G value was measured with a spectral colorimeter (spectral colorimeter CM-2600d manufactured by Konica Minolta, Inc.), and the result was 116, which was found to be on par with glossy plastic.

The color difference after irradiation with an ultraviolet lamp (intensity 12,000 μW/cm$^2$, wavelength 365 nm) for 1 h was measured with a spectral colorimeter (spectral colorimeter CM-2600d manufactured by Konica Minolta, Inc.). The color difference ΔE*ab was 0.48, which was found to be within the AA-class tolerance range.

Example 5

<Preparation of Reinforced Coating Layer>

A reinforced coating layer was prepared in the same manner as in Example 1, except that the coating method was spray coating and the drying was performed under room temperature conditions. There was no cissing, and coating could be performed uniformly.

<Evaluation>

When the tape peeling test was performed on the obtained reinforced coating layer, peeling was not observed, and it was determined that the sample passed the tape peeling test. Also, when the cross-cut tape test (JIS K 5600) was performed on the same sample, peeling was not observed, and the cross-cut tape test was classified as class 0. A pencil hardness test according to JIS K 5600 was performed and the pencil hardness was determined to be 3H. In order to evaluate the gloss of the reinforced coating layer, the G value was measured with a spectral colorimeter (spectral colorimeter CM-2600d manufactured by Konica Minolta, Inc.), and the result was 99, which was found to be on par with glossy plastic. The test for endurance against washing in a dishwasher was performed in the same manner as in Example 1. The color difference after 100 cycles of washing was 0.76, which was found to be within the AA-class tolerance range.

Example 6

<Preparation of Reinforced Coating Layer>

A reinforced coating layer was prepared in the same manner as in Example 2, except that the substrate type was a wood molded plate. There was no cissing, and coating could be performed uniformly.

<Evaluation>

When the tape peeling test was performed on the obtained reinforced coating layer, peeling was not observed, and it was determined that the sample passed the tape peeling test. Also, when the cross-cut tape test (JIS K 5600) was performed on the same sample, peeling was not observed, and the cross-cut tape test was classified as class 0.

The color difference between before and after the application of the protective film was measured with a spectral colorimeter (spectral colorimeter CM-2600d manufactured by Konica Minolta, Inc.), and the color difference $\Delta E*ab$ was 1.048, which was found to be within the AA-class tolerance range. In order to evaluate the gloss of the reinforced coating layer, the G value was measured with a spectral colorimeter (spectral colorimeter CM-2600d manufactured by Konica Minolta, Inc.), and the result was 100, which was found to be on par with glossy plastic.

Example 7

<Preparation of Reinforced Coating Layer>

A reinforced coating layer was prepared in the same manner as in Example 6, except that the color of the iridescent coating was green. There was no cissing, and coating could be performed uniformly.

<Evaluation>

When the tape peeling test was performed on the obtained reinforced coating layer, peeling was not observed, and it was determined that the sample passed the tape peeling test. Also, when the cross-cut tape test (JIS K 5600) was performed on the same sample, peeling was not observed, and the cross-cut tape test was classified as class 0. The color difference between before and after the application of the protective film was measured with a spectral colorimeter (spectral colorimeter CM-2600d manufactured by Konica Minolta, Inc.), and the color difference $\Delta E*ab$ was 0.948, which was found to be within the AA-class tolerance range. In order to evaluate the gloss of the reinforced coating layer, the G value was measured with a spectral colorimeter (spectral colorimeter CM-2600d manufactured by Konica Minolta, Inc.), and the result was 99.5, which was found to be on par with glossy plastic.

Example 8

<Preparation of Reinforced Coating Layer>

A reinforced coating layer was prepared in the same manner as in Example 6, except that the coating layer surface of the iridescent coating was a urethane resin and the color was purple. There was no cissing, and coating could be performed uniformly.

<Evaluation>

When the tape peeling test was performed on the obtained reinforced coating layer, peeling was not observed, and it was determined that the sample passed the tape peeling test. Also, when the cross-cut tape test (JIS K 5600) was performed on the same sample, peeling was not observed, and the cross-cut tape test was classified as class 0. The color difference between before and after the application of the protective film was measured with a spectral colorimeter (spectral colorimeter CM-2600d manufactured by Konica Minolta, Inc.), and the color difference $\Delta E*ab$ was 1.554, which was found to be within the AA-class tolerance range. In order to evaluate the gloss of the reinforced coating layer, the G value was measured with a spectral colorimeter (spectral colorimeter CM-2600d manufactured by Konica Minolta, Inc.), and the result was 100, which was found to be on par with glossy plastic.

Example 9

<Preparation of Reinforced Coating Layer>

A reinforced coating layer was prepared in the same manner as in Example 6, except that the substrate type was an aluminum plate and no organically-modified synthetic clay was added. There was no cissing, and coating could be performed uniformly.

<Evaluation>

When the tape peeling test was performed on the obtained reinforced coating layer, peeling was not observed, and it was determined that the sample passed the tape peeling test. Also, when the cross-cut tape test (JIS K 5600) was performed on the same sample, peeling was not observed, and the cross-cut tape test was classified as class 0. The color difference between before and after the application of the protective film was measured with a spectral colorimeter (spectral colorimeter CM-2600d manufactured by Konica Minolta, Inc.), and the color difference $\Delta E*ab$ was 0.76, which was found to be within the AA-class tolerance range. In order to evaluate the gloss of the reinforced coating layer, the G value was measured with a spectral colorimeter (spectral colorimeter CM-2600d manufactured by Konica Minolta, Inc.), and the result was 101.5, which was found to be on par with glossy plastic.

Example 10

<Preparation of Reinforced Coating Layer>

A reinforced coating layer was prepared in the same manner as in Example 3, except that the number of parts by weight of the solvent per 30 parts by weight of the resin was 35 and the drying condition was room temperature. There was no cissing, and coating could be performed uniformly.

<Evaluation>

When the tape peeling test was performed on the obtained reinforced coating layer, peeling was not observed, and it was determined that the sample passed the tape peeling test. In order to evaluate the gloss of the reinforced coating layer, the G value was measured with a spectral colorimeter (spectral colorimeter CM-2600d manufactured by Konica Minolta, Inc.), and the result was 100.6, which was found to be on par with glossy plastic.

The above examples and comparative examples are summarized in Tables 1 and 2.

TABLE 1

| Item | Comparative Example 1 | Comparative Example 2 | Comparative Example 3 | Example 1 | Example 2 | Comparative Example 4 | Comparative Example 5 | Example 3 |
|---|---|---|---|---|---|---|---|---|
| Coating layer | ○ | ○ | ○ | | | | | |
| Reinforced coating layer | | | | ○ | ○ | ○ | ○ | ○ |
| Organically-modified synthetic clay (organically-modifying agent) | | | | SPN | SPN | SPN | SPN | SPN |
| Resin | | | | UV-7605B | UV-7605B | UV-7605B | UV-7605B | UV-7605B |
| Parts by weight of clay per 30 parts by weight of resin | | | | 3 | 3 | 0 | 0 | 1.5 |
| Solvent (dispersion solvent) | | | | Thinner | Thinner | Thinner | Thinner | Thinner |
| Parts by weight of solvent per 30 parts by weight of resin | | | | 70 | 70 | 70 | 70 | 66.5 |
| Parts by weight of polymerization initiator per 30 parts by weight of resin | | | | 6 | 6 | 6 | 6 | 6 |
| Viscosity [mPa · s] | | | | | | | | |
| Type of substrate | Glass | Glass | Glass | Glass | Glass | Glass | Glass | Glass |
| Coating layer | Urethane | Cashew | Lacquer | Urethane | Cashew | Urethane | Urethane | Urethane |
| Color of coating layer | Black | Red | Brown | Black | Red | Black | Black | Black |
| Coating method | | | | Bar coater | Bar coater | Bar coater | Spray | Spray |
| Drying method | | | | 60° C., 3 min | 60° C., 3 min | 60° C., 3 min | Room temperature | 60° C., 3 min |
| Ultraviolet radiation curing time [min] | | | | 15 | 15 | 15 | 15 | 15 |
| Presence/absence of cissing | | | | No | No | No | Yes | No |
| Cross-cut tape test | | | | Class 0 | Class 0 | | | |
| Surface hardness (pencil hardness test) | F | HB | F | 3H | 3H | | | 3H |
| Color difference caused by application of protective layer | | | | 0.27 | 0.441 | | | |
| G value measurement | 111 | | | 98.5 | 103.25 | | | |
| Color difference after 100 cycles of washing in dishwasher | 0.97 | | | 0.75 | | | | |
| Color difference after 1 h of irradiation with ultraviolet lamp | 0.16 | | | 0.05 | | 0.13 | | |

TABLE 2

| Item | Comparative Example 6 | Example 4 | Example 5 | Example 6 | Example 7 | Example 8 | Example 9 | Example 10 |
|---|---|---|---|---|---|---|---|---|
| Coating layer | ○ | | | | | | | |
| Reinforced coating layer | | ○ | ○ | ○ | ○ | ○ | ○ | ○ |
| Organically-modified synthetic clay (organically-modifying agent) | | SPN | SPN | SPN | SPN | SPN | SPN | SPN |
| Resin | | UV-7605B | UV-7605B | UV-7605B | UV-7605B | UV-7605B | UV-7605B | UV-7605B |
| Parts by weight of clay per 30 parts by weight of resin | | 3 | 3 | 3 | 3 | 3 | 0 | 1.5 |
| Solvent (dispersion solvent) | | Thinner | Thinner | Thinner | Thinner | Thinner | Thinner | Thinner |
| Parts by weight of solvent per 30 parts by weight of resin | | 70 | 70 | 70 | 70 | 70 | 70 | 35 |
| Parts by weight of polymerization initiator per 30 parts by weight of resin | | 6 | 6 | 6 | 6 | 6 | 6 | 6 |
| Viscosity [mPa · s] | | | | | | | | |
| Type of substrate | Glass | Glass | Glass | Wood molded material | Wood molded material | Wood molded material | Aluminum plate | Glass |
| Coating layer | Urethane | Urethane | Urethane | Cashew | Cashew | Urethane | Cashew | Urethane |
| Color of coating layer | Blue | Blue | Black | Red | Green | Purple | Red | Black |
| Coating method | | Bar coater | Spray | Bar coater | Bar coater | Bar coater | Bar coater | Spray |
| Drying method | | Room temperature | Room temperature | 60° C., 3 min | 60° C., 3 min | 60° C., 3 min | 60° C., 3 min | Room temperature |
| Ultraviolet radiation curing time [min] | | 15 | 15 | 15 | 15 | 15 | 15 | 15 |
| Presence/absence of cissing | | | No | No | No | No | No | No |
| Cross-cut tape test | | Class 0 | | Class 0 | Class 0 | Class 0 | Class 0 | |
| Surface hardness (pencil hardness test) | | 3H | | | | | | |
| Color difference caused by application of protective layer | | 0.577 | | 1.048 | 0.948 | 1.554 | 0.76 | |
| G value measurement | 116 | | 99 | 100 | 99.5 | 100 | 101.5 | 100.6 |

TABLE 2-continued

| Item | Comparative Example 6 | Example 4 | Example 5 | Example 6 | Example 7 | Example 8 | Example 9 | Example 10 |
|---|---|---|---|---|---|---|---|---|
| Color difference after 100 cycles of washing in dishwasher | | | 0.76 | | | | | |
| Color difference after 1 h of irradiation with ultraviolent lamp | 3.52 | 0.48 | | | | | | |

Example 11

<Trial Production>

A reinforced coating layer was applied to products of three-dimensional shapes by using the coating agent and preparation conditions of Example 10. There was no cissing, and coating could be performed uniformly on the entire surface. There were six types of products: a sake cup, a lipped bowl, a tumbler, an old-fashioned tumbler, a porcelain dish, and a porcelain small bowl.

Example 12

<Preparation of Coating Layer>

A coating layer was prepared in the same manner as in Example 1, except that the solvent was a mixture of equal amounts of butyl acetate and ethyl acetate and the base material was glass. There was no cissing, and coating could be performed uniformly.

<Evaluation>

A pencil hardness test according to JIS K 5600 was performed with respect to the obtained reinforced coating layer and the pencil hardness was determined to be 8H.

Example 13

<Preparation of Coating Layer>

A coating layer was prepared in the same manner as in Example 1, except that the solvent was a mixture of equal amounts of methyl isobutyl ketone and butyl acetate and the base material was glass. There was no cissing, and coating could be performed uniformly.

<Evaluation>

A pencil hardness test according to JIS K 5600 was performed with respect to the obtained reinforced coating layer and the pencil hardness was determined to be 8H.

Discussion of Examples and Comparative Examples

The comparison of examples and meaning thereof are presented hereinbelow.

It is understood from Comparative Example 1 and Example 1 that the surface hardness is increased (in the case of urethane resin) by the application of the protective film.

It is understood from Comparative Example 2 and Example 2 that the surface hardness is increased (in the case of the cashew resin) by the application of the protective film.

It is understood from Example 1 and Example 2 that a protective film can be applied to both urethane and cashew, and the adhesiveness of the protective film is good.

It is understood from Comparative Example 4 and Comparative Example 5 that with the bar coater method, a protective film can be applied even without addition of clay, but in the case of the spray coating method, cissing occurs and a protective film cannot be applied when the clay is not added.

It is understood from Example 1 and Example 5 that a protective film having the same performance can be applied even when the drying condition is changed from 60° C., 3 min to room temperature drying.

It is understood from Example 2 and Example 6 that a protective film having the same performance can be applied to glass and a wood molded material (in the case of a cashew resin).

It is understood from Example 6 and Example 7 that a protective film having the same performance can be applied even when the color of the coating layer is changed from red to green.

It is understood from Example 6 and Example 8 that a protective film having the same performance can be applied even when a cashew resin is replaced with a urethane resin.

It is understood from Example 1 and Example 8 that a protective film having the same performance can be applied to glass and a wood molded material (in the case of a urethane resin).

It is understood from Example 2 and Example 9 that a protective film having the same performance can be applied to glass and an aluminum plate.

It is understood from Example 3 and Example 10 that a protective film having the same performance can be applied even when the amount of solvent is reduced from 70 parts by weight to 35 parts by weight.

It is understood from Example 11 that the present coating agent can be uniformly coated on products of various different shapes.

INDUSTRIAL APPLICABILITY

As described in detail hereinabove, the present invention relates to a coating agent containing an organically-modified synthetic clay, a resin, and an organic solvent, a protective film using the coating agent, and a product to which the protective film is applied. (1) With the coating agent of the present invention, it is possible to form a protective film which tightly adheres to the surface of lacquerware or the like with sufficient strength as a result of low-temperature treatment and has hard coat properties, durability against washing in a dishwasher or the like, transparency, ultraviolet resistance, and ultraviolet blocking property. (2) In particular, the coating agent of the present invention can be coated without causing cissing even when spray coating is used, and the coating agent maintains excellent light transmittance. Accordingly, the present invention has excellent industrial applicability.

The invention claimed is:

1. A coating agent containing an organically-modified synthetic clay formed from a synthetic clay and an organically-modifying agent, a resin, and an organic solvent, wherein the organic solvent is in the range of 5 parts by weight to 70 parts by weight with respect to 30 parts by weight of the resin, and the organic solvent contains two or more selected from the group consisting of toluene, xylene, ethylbenzene, ethyl acetate, butyl acetate, and methyl isobutyl ketone, and wherein the organically-modifying agent contains polyoxypropylene methyl diethyl ammonium.

2. The coating agent according to claim 1, wherein the organically-modified synthetic clay is in the range of 1 part by weight to 25 parts by weight with respect to 30 parts by weight of the resin.

3. The coating agent according to claim 1, wherein the resin is an ultraviolet-curable resin.

4. The coating agent according to claim 1, and further containing an organic compound that absorbs ultraviolet radiation.

5. A method of making a protective film on a surface of a base material or of a coating layer on the base material, said method comprises coating the coating agent according to claim 1 on the surface, and evaporating said organic solvent therefrom.

6. The method according to claim 5, wherein when a reinforced coating layer having the protective film is on the surface of the coating layer, a color difference $\Delta E^*ab$ between the coating layer and the reinforced coating layer is 1.6 or less.

7. The method according to claim 5, wherein when a reinforced coating layer having the protective film is on the surface of the coating layer, a difference in a G value, which is an index relating to a gloss, between the coating layer and the reinforced coating layer is 20 or less.

8. A method of making a reinforced coating layer, said method comprises coating the coating agent according to claim 1 on comprising: a coating layer, and evaporating the organic solvent therefrom.

9. The method according to claim 8, wherein the reinforced coating layer has a pencil hardness is 3H or more.

10. A method of making a product comprising a reinforced coating layer according to claim 8 on a surface of at least a part of a base material constituting the product, said method comprises coating the coating agent according to claim 1 on a coating layer coated on the surface, and evaporating the organic solvent therefrom.

11. The method according to claim 10, wherein the base material comprises at least one selected from the group consisting of glass, ceramics, plastics, metals, and wood, wherein the base material is a molded article.

12. The method according to claim 10, wherein
the coating layer is formed of a plurality of layers including a silver-seeded layer and a semitransparent layer,
the silver-seeded layer is formed as a layer positioned between the base material and the semitransparent layer, and
a dye is contained in the semitransparent layer.

13. The method according to claim 10, wherein a main component of the semitransparent layer is a urethane resin, a cashew resin, or a lacquer.

14. The method according to claim 10, wherein after 100 cycles of washing the product with a detergent in a dishwasher, the product has a color difference $\Delta E^*ab$ of 1.6 or less from the color of the product before the 100 cycles of washing.

15. The method according to claim 10, wherein after exposing the product to 1 hour of irradiation with ultraviolet radiation of a wavelength of 365 nm and an intensity of 12,000 $\mu W/cm^2$, the product has a color difference $\Delta E^*ab$ of 1.6 or less from the color of the product before the exposure.

16. A coating agent comprising
a synthetic clay being organically modified with an organically-modifying agent consisting of polyoxypropylene methyl diethyl ammonium,
a resin, and
an organic solvent mixture consisting of two or more organic solvents selected from the group consisting of toluene, xylene, ethylbenzene, ethyl acetate, butyl acetate, and methyl isobutyl ketone,
wherein the amount of the synthetic clay is 1 to 25 parts per weight per 30 parts per weight of the resin, and
wherein the amount of the organic solvent mixture is 5 to 70 parts per weight per 30 parts per weight of the resin.

17. The coating agent according to claim 16,
wherein the amount of the synthetic clay is 1.5 to 3 parts per weight per 30 parts per weight of the resin, and
wherein the amount of the organic solvent mixture is 35 to 70 parts per weight per 30 parts per weight of the resin.

\* \* \* \* \*